(12) United States Patent
Adcock et al.

(10) Patent No.: US 9,043,210 B1
(45) Date of Patent: May 26, 2015

(54) BIOMETRIC VOICE COMMAND AND CONTROL SWITCHING DEVICE AND METHOD OF USE

(71) Applicants: Sherrie Adcock, Dana Point, CA (US); Kent Robinson, Dana Point, CA (US); Brad Clements, Bend, OR (US); Mark Keith Brockelsby, Newcastle (AU); William Keith Brockelsby, Torbay Auckland (NZ)

(72) Inventors: Sherrie Adcock, Dana Point, CA (US); Kent Robinson, Dana Point, CA (US); Brad Clements, Bend, OR (US); Mark Keith Brockelsby, Newcastle (AU); William Keith Brockelsby, Torbay Auckland (NZ)

(73) Assignee: Voice Security Systems, Inc., Dana Point, CA (US)

( * ) Notice: Subject to any disclaimer, the term of this patent is extended or adjusted under 35 U.S.C. 154(b) by 292 days.

(21) Appl. No.: 13/633,708

(22) Filed: Oct. 2, 2012

(51) Int. Cl.
G10L 21/00 (2013.01)
G10L 15/30 (2013.01)
G10L 15/183 (2013.01)

(52) U.S. Cl.
CPC .............. *G10L 15/30* (2013.01); *G10L 15/183* (2013.01)

(58) Field of Classification Search
CPC ....... G10L 15/20; G10L 15/28; G10L 15/183; G10L 15/24; G10L 15/197; G10L 15/30; G10L 17/30; H04M 2250/74; B60R 25/2045; B60R 25/25; B60R 25/257
USPC .............. 704/246, 270, 270.1, 273, 275, 247, 704/231, 250; 379/88.01–88.04, 88.19; 713/186, 182; 455/556.1, 563; 701/36; 340/426.1
See application file for complete search history.

(56) References Cited

U.S. PATENT DOCUMENTS

| | | | |
|---|---|---|---|
| 3,673,331 A | 6/1972 | Hair et al. | |
| 4,450,545 A | 5/1984 | Kishi et al. | |
| 4,752,958 A | 6/1988 | Cavazza et al. | |
| 4,833,713 A | 5/1989 | Muroi et al. | |
| 4,856,072 A | 8/1989 | Schneider et al. | |
| 5,313,556 A | 5/1994 | Parra | |
| 6,094,632 A | 7/2000 | Hattori | |
| 6,188,986 B1 | 2/2001 | Matulich et al. | |
| 6,366,198 B1 | 4/2002 | Flick | |
| 6,498,970 B2 * | 12/2002 | Colmenarez et al. | 701/36 |
| 6,519,565 B1 | 2/2003 | Clements et al. | |
| 7,409,343 B2 | 8/2008 | Charlet | |
| 8,005,680 B2 * | 8/2011 | Kommer | 704/275 |
| 2002/0152010 A1 * | 10/2002 | Colmenarez et al. | 701/36 |
| 2007/0055517 A1 * | 3/2007 | Spector | 704/246 |
| 2007/0124134 A1 * | 5/2007 | Van Kommer | 704/10 |
| 2008/0167868 A1 | 7/2008 | Kanevsky et al. | |
| 2010/0192096 A1 | 7/2010 | Barrett | |
| 2013/0346867 A1 * | 12/2013 | Woods et al. | 715/728 |

FOREIGN PATENT DOCUMENTS

EP 0902943 B1 8/2002

OTHER PUBLICATIONS

Author: Unknown, Title: Portable Electronic Vents for Acoustics, Date: Unknown.

* cited by examiner

*Primary Examiner* — Vijay B Chawan
(74) *Attorney, Agent, or Firm* — Karich & Associates; Eric Karich

(57) ABSTRACT

A biometric voice command and control switching device has a microphone assembly for receiving a currently spoken challenge utterance and a reference utterance, and a voice processing circuit for creating electronic signals indicative thereof. The device further includes a memory for storing the electronic signals, and a processor for comparing the electronic signals to determine if there is a match. If there is a match, an interface circuit enables the operable control of the controlled device.

13 Claims, 11 Drawing Sheets

BIOMETRIC VOICE COMMAND AND CONTROL SWITCHING DEVICE AND METHOD OF USE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

The invention disclosed herein relates generally to electronic switching devices which also provide for biometric acquisition and comparison of human voice patterns, in order to distinguish between individuals and perform a switching action or command by other digital communication means that communicates with and controls another external device when a successful match is made between a live utterance sample and stored biometric patterns.

2. Description of Related Art

The following patents form a background for the instant invention. None of the cited publications is believed to detract from the patentability of the claimed invention.

Hair et al., U.S. Pat. No. 3,673,331, describes voice verification that is accomplished at a plurality of spaced apart facilities each having a plurality of terminals. Multiplexing structure interconnects the terminals through a communications link to a central processing station. Analog reproductions of voices transmitted from the terminals are converted into digital signals. The digital signals are transformed into the frequency domain at the central processing station. Predetermined features of the transformed signals are compared with stored predetermined features of each voice to be verified. A verify or non-verify signal is then transmitted to the particular terminal in response to the comparison of the predetermined features. The principal disadvantage is that it cannot operate in a self contained device and requires a network of terminals and a central processing station for authentication of an individual.

Kishi et al., U.S. Pat. No. 4,450,545, describes a voice responsive door lock system for a motor vehicle wherein the operation of the door lock device is vocally controlled by the driver. The voice responsive door lock system for a motor vehicle comprises a door position detection means, an indication means for indicating a question as to the necessity of locking the door, a voice recognition unit for identifying the driver's reply and producing a door lock command signal, and a door lock control means for actuating a door lock device upon receiving the door lock command signal. This teaches a method for locking a door with a voice command, but has the disadvantage of using a speaker independent voice recognition technology instead of biometric speaker verification technology making it unsuitable for unlocking the previously locked door from outside the secured space.

Cavazza et al., U.S. Pat. No. 4,752,958, discloses a device that obtains several characteristic parameters from a standard sentence said by a speaker and compares them with average parameters of the same speaker stored in an internal memory and previously calculated. According to the comparison, it obtains a probability value that the sentence spoken belongs to that speaker and compares the value with a threshold normalized to the average parameter variance by a threshold calculation circuit. If the threshold is overcome, the device considers the speaker verified. A circuit determines the real instants of sentence beginning and end using a noise-adaptive threshold in order to limit between these two instants the time interval over which characteristic parameters are to be calculated. A circuit aligns as to time the characteristic parameters just calculated to the parameters of a reference sentence, obtaining standard lengths of the sounds composing the sentence spoken. A variable probability threshold is controlled by the standard deviations of the histogram of the average of the characteristic parameter vectors. The disadvantage of a cadence based voice reference pattern is that it is not suitable for rejecting random background noise since it does not account for differences in the frequency domain, thus simply humming in the correct cadence would yield a positive result even though the correct phrase was not spoken.

Muroi et al., U.S. Pat. No. 4,833,713, describes a voice or sound recognition system including a microphone for converting a voice into an electrical voice signal, a frequency analyzer for generating a voice pattern in the form of a time-frequency distribution, and a matching unit for matching the voice pattern with registered voice patterns. This is one of many methods published for biometric acquisition and matching system, but does not define a method or apparatus for managing multiple commands and individuals or translating the verification results to an appropriate and useful output result.

Schneider et al., U.S. Pat. No. 4,856,072, describes a voice actuated vehicle security system that includes both internal and external microphones for receiving vocal instructions and internal and external speakers for delivering vocal messages. During a training period, a plurality of voice recognition templates are stored in memory representing one or more authorized vehicle operators. A voice recognition and synthesis unit interfaces the microphones and the speakers with a microcomputer to permit the system to respond to changes in vehicle conditions by delivering the associated vocal messages and to respond to vocal instructions to control vehicle elements such as door locks, lights, etc. The principal disadvantage is that the device is not useful for controlling a wide variety of external devices, but rather only the vehicle security system that contains the biometric acquisition module.

Parra, U.S. Pat. No. 5,313,556, describes a method for determining the identity of an individual (known or unknown) by a sonic profile of sounds issued through his oral-nasal passages. The sounds are converted to digital electrical signals and produce a three domain format of frequency, amplitude and time samples to produce an array of peaks and valleys constituting the sonic profile of an individual. A source or library of sonic profiles in the same format of a known individual have a interrelationship including relative positions of said peaks and valleys of said sonic profile of the known individual with that of said unknown individual compared and a utilization signal is provided upon detecting or non-detecting a correlation between said sonic profiles. The disadvantage of this system is that it requires the individual to carry a magnetic card containing the identity of the individual which can be misplaced rendering the system unusable for that individual. It also requires an intermediate manual step to translate an audio recording into a usable reference pattern.

Hattori, U.S. Pat. No. 6,094,632, discloses a speaker recognition device for judging whether or not an unknown speaker is an authentic registered speaker himself/herself executes 'text verification using speaker independent speech recognition' and 'speaker verification by comparison with a reference pattern of a password of a registered speaker'. A presentation section instructs the unknown speaker to input an ID and utter a specified text designated by a text generation section and a password. The 'text verification' of the specified text is executed by a text verification section, and the 'speaker verification' of the password is executed by a similarity calculation section. The judgment section judges that the unknown speaker is the authentic registered speaker himself/ herself if both the results of the 'text verification' and the 'speaker verification' are affirmative. According to the device, the 'text verification' is executed using a set of speaker independent reference patterns, and the speaker verification' is executed using speaker reference patterns of passwords of registered speakers, thereby storage capacity for storing reference patterns for verification can be considerably reduced. Preferably, 'speaker identity verification' between the specified text and the password is executed. The disadvantage of this system is that it involves a two part verification which is inefficient and cumbersome to individuals using the system.

Matulich et al., U.S. Pat. No. 6,188,986, describes a voice activated device for producing control signals in response to speech that is self contained and requires no additional software or hardware. The device may be incorporated into a housing that replaces a wall switch that is connected to an AC circuit. An alternate housing is portable and includes a jack that plugs into and lies flush against a standard AC utility outlet, and at least one plug for accepting an AC jack of any electronic product or appliance. The device acts as a control interface between utility power and connected electrical devices by connecting or disconnecting power to the electrical devices based on speech commands. The system described offers voice control of a self contained switching device using speaker independent recognition technology. The disadvantage is that it can be used by anyone and cannot distinguish between different individuals and is therefore unsuitable for controlling access restriction devices (such as locks, etc.) and also is unable to provide administrative features restricted to a select group of authorized individuals. The device disclosed also fails to intelligently switch between opposing states using a single, user selectable command. The device also does not intelligently track a state to change switching behavior using the said single, user selectable command.

Clements et al., U.S. Pat. No. 6,519,565, describes a security method that compares a present verbal utterance with a previously recorded verbal utterance by comparing time-frequency domain representations of the utterances, with multiple repeat utterances forming a basis for determining a variation in repetitious performance by an individual, and similar differences between enrollment and challenge utterances forming a basis for similar analysis of variance between enrollment and challenge utterances. In one embodiment a set of enrollment data is searched by each challenge until either a match is made, indicating an action, possibly dependent upon the specific match, or no match is made indicating an abort. In one application an individual is accepted or rejected as an impostor, in another application, a selected action is accepted as corresponding to a verbal command. This method defines a single security action possibly different for each voice command, but does not define a plurality of opposing signals for the same voice command spoken by the same individual depending on the current state of the host device. It also does not teach a method for using the system's verification result to offer administrative features to only a specific sub-set of authorized individuals.

Charlet, U.S. Pat. No. 7,409,343, teaches verification score normalization in a speaker voice recognition device. During a learning phase, a speech recognition device generates parameters of an acceptance voice model relating to a voice segment spoken by an authorized speaker and a rejection voice model. It uses normalization parameters to normalize a speaker verification score depending on the likelihood ratio of a voice segment to be tested and the acceptance model and rejection model. The speaker obtains access to a service application only if the normalized score is above a threshold. According to the invention, a module updates the normalization parameters as a function of the verification score on each voice segment test only if the normalized score is above a second threshold. This patent teaches one method for updating a previously stored speech reference pattern, but does so in a destructive manner. The disadvantage of this system is that an update to the reference pattern acts on the reference data as a whole and does not preserve any of the original proven reference patterns. This can lead to a "lockout: condition under which the updated reference pattern my be updated so as to be unusable by an individual in several locations do to the updated average from a sample captured in a different ambient audio environment than will be used on subsequent authorization attempts.

With so many systems relying on electronic circuits to control a variety of devices previously operated mechanically, there exists an opportunity to develop a way to offer an off-the-shelf consumer level, low cost solution that could be multi-purposed for additional uses other than physical access. Developing a solution of this type is not without challenges, some of which do not have obvious solutions. The present invention provides novel and non-obvious solutions to these challenges which will be revealed in this application.

The prior art teaches the comparing of voice utterances in order to perform an undefined "security action" by a hardware device supporting the voice technology. However, the prior art does not teach the design of a host electronic hardware device capable of controlling a wide variety of external devices, nor does it provide the necessary user interface and device management facilities. The present invention device fulfills this need and provides further non-obvious advantages in design as described in the following summary.

SUMMARY OF THE INVENTION

The present invention teaches certain benefits in construction and use which give rise to the objectives described below.

The present invention provides a biometric voice command and control switching device and method of use. The biometric voice command and control switching device operably controls a controlled device in response to a currently spoken challenge utterance by comparing the currently spoken challenge utterance to at least one previously stored reference utterance. The biometric voice command and control switching device comprises a microphone assembly for receiving the currently spoken challenge utterance and the at least one previously stored reference utterance, a voice processing circuit for creating an electronic signal indicative of the currently spoken challenge utterance and the at least one previously stored reference utterance, a memory for storing the electronic signals of the currently spoken challenge utterance and the at least one previously stored reference utterance, and a processor for comparing the electronic signals of the currently spoken challenge utterance and the at least one previously stored reference utterance and determining if there is a match. If there is a match, an interface circuit enables the operable control of the controlled device.

A primary objective of the present invention is to provide a biometric voice command and control switching device and method of use having advantages not taught by the prior art.

Another objective is to provide a biometric voice command and control switching device and method of use that includes a biometric voice switch is useful to control an existing electronic lock, latch, or electro-mechanically actuated door or gate, without requiring the individual using it to possess any type of key, card or security token to use the embodiment.

Another objective is to provide a biometric voice command and control switching device and method that is useful to prevent an external electronic switch from operating until a previously captured utterance is detected. The same utterance can be used to enable or disable the security action of these embodiments.

Another objective is to provide a biometric voice command and control switching device and method of use that is able to function despite background noise, and to successfully detect and reject utterances captured that do not match any of the previously captured utterances.

A further objective is to provide a biometric voice command and control switching device and method of use that assigns administrative privileges automatically created for at least the first two utterances stored to provide management of configurable features restricted by said administrative privileges.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a biometric voice command and control switching device 10 and method of use for operatively controlling a controlled device 12 in response to a currently spoken challenge utterance by correlating the currently spoken challenge utterance and comparing it to at least one previously stored reference utterance.

Figure 1:
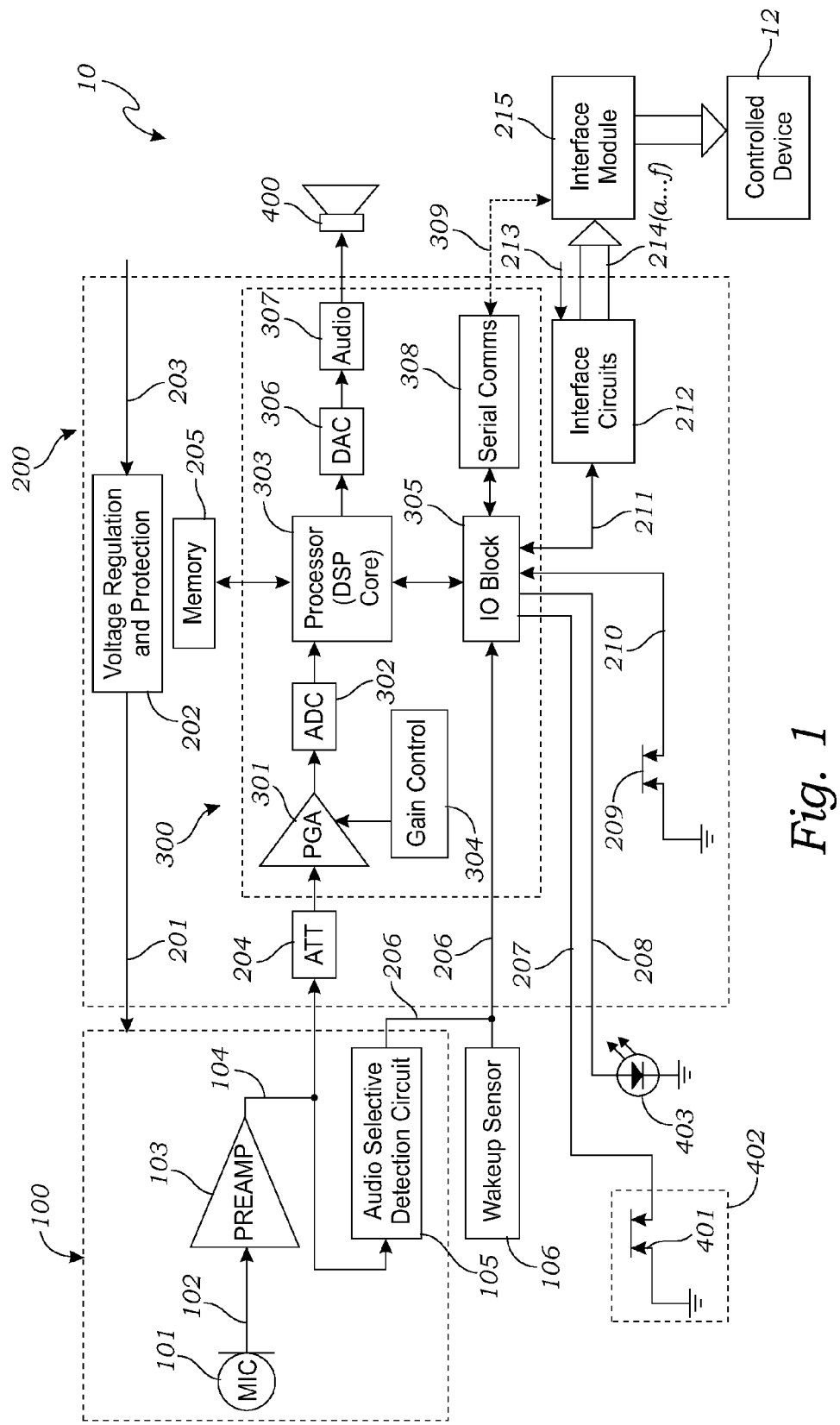
FIG. 1 is a block diagram of a biometric voice command and control switching device according to one embodiment of the present invention, wherein the device includes a single microphone assembly.

FIG. 1 is a block diagram of the biometric voice command and control switching device according to one embodiment of the present invention. As illustrated in FIG. 1, the biometric voice command and control switching device 10 includes a microphone assembly 100 operably connected with a processing device 200. The processing device 200 may be operably connected with an interface module 215, as discussed in greater detail below, for operably controlling the controlled device 12, as discussed in greater detail below.

Figure 2:
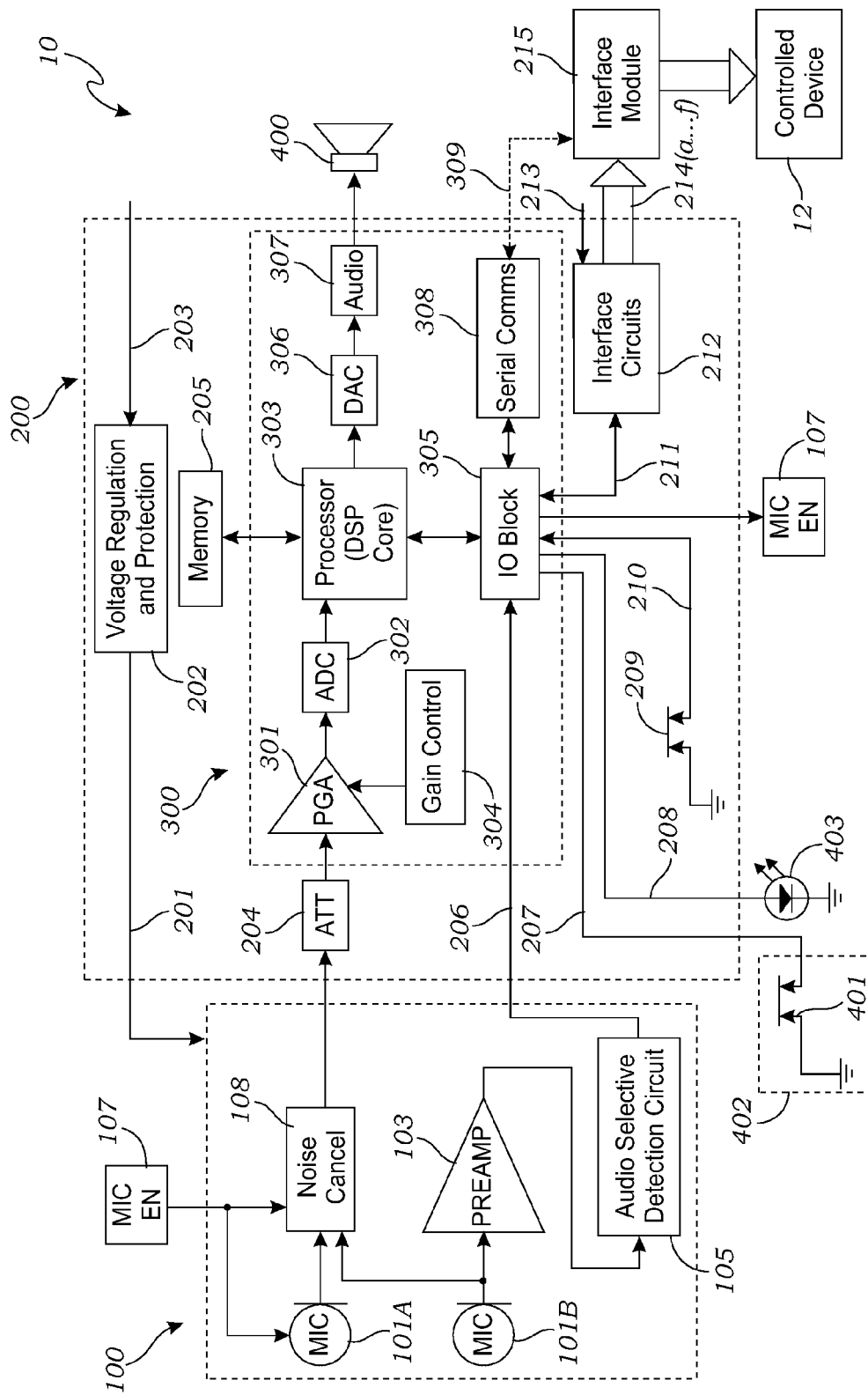
FIG. 2 is a block diagram of a second embodiment of the biometric voice command and control switching device, wherein the microphone assembly includes two microphones and a noise cancellation circuit.

As illustrated in FIG. 1, the microphone assembly 100 may include a microphone 101, a preamp circuit 103 to amplify the microphone signal output 102 to an amplified microphone output 104 to provide a suitable signal level for an audio selective detection circuit 105. The audio selective detection circuit 105 is operably connected with the processing device 200 via an external wakeup signal output 206 along with a wakeup sensor 106, discussed in greater detail below. The audio selective detection circuit 105 can be configured to selectively trigger on many specific sounds such as a specific tone, single or double tap, sudden change in noise level, etc. In one embodiment, the trigger may be speaking a distinct word (e.g., FREEKEY, a registered trademark of Voice Security Systems, Inc.). A second microphone and noise-cancelling circuit may be included in the assembly to reduce background sound to enhance the capture of the currently spoken challenge utterance, as illustrated in FIG. 2 and as discussed below.

The wakeup sensor 106 may be included to provide an alternative means for initiating interaction with the device, and functions the same as the audio wakeup discussed above. The alternative wakeup sensor may include a wide variety of sensors known in the art for this purposes (e.g., an infrared proximity sensor, RF proximity sensor, infrared/motion detector, touch sensor, button, etc.). A wide variety of both touch and hands-free sensors and switches that can be concealed are commonly available in the market and well understood by those skilled in the art useful for this purpose.

The wakeup sensor 106 and the audio selective detection circuit 105 may be connected to the processor 303 via an external wakeup signal output 206 for detecting an external wakeup signal (i.e., someone outside of a secure space trying to initiate the device 10). In this case, the external wakeup signal output 206 is connected to the processor 303 via an IO block 305.

The device 10 may further include an internal wakeup signal output 207 for detecting an internal wakeup or command signal, from within a secured space 402 (e.g., inside a vehicle, structure, etc.). The internal wakeup signal output 207 may receive the signal via a concealed momentary switch 401 accessible only from the secured space 402. The switch 401 may be any form of button, toggle, or other form of input known in the art. In alternative embodiments, other forms of actuation or authorization may be used, and such alternative structures are considered within the scope of the present invention.

A low voltage switched output line 208 may also be included for the purpose of illuminating a status LED 403 that is visible to an individual using the device, to facilitate use of the device, for example, to indicate when the device 10 is receiving, when it has been successfully utilized, or when there is an error or rejection of a voice authorization.

An internal mounted momentary switch 209 connected to a digital signal input 210 may also be included for the purposes of resetting and configuring installer options of the device. Since the device 10 is typically located within the secured space 402, this switch 209 is only used by the user in the secured space.

The device 10 further includes an interface circuit 212 operably connected with the IO block via output connection 211. The interface circuit 212 is used for converting low level digital signals to and from the IO Block 305 controlled by the processor 303. The interface circuit 212 interfaces with an interface module 215 of the controlled device 12 for the purposes of controlling the controlled device 12, as discussed in greater detail below.

The processing device 200 includes a voltage regulation and protection circuit 202 for providing power to the processing device 200 and the microphone assembly 100 (which may or may not include a combiner and/or noise cancelling technology). The voltage regulation and protection circuit 202 may be operably connected to a power source input 203 for receiving power from a suitable source (e.g., a battery, a vehicle in which the device 10 is installed, etc.). The voltage regulation and protection circuit 202 may also be connected to the microphone assembly 100 via power input lines 201.

The processing device 200 also includes an attenuation circuit 204 to receive the amplified microphone output 104 and provide microphone level signals to a voice processing unit 300 which may be contained in a single integrated circuit. The voice processing unit 300 may include a plurality of components necessary for comparing a currently spoken challenge utterance with at least one previously stored reference utterance to determine if there is a match. The voice processing unit 300 may include, in one embodiment, a programmable gain amplifier 301 operably controlled by a digital gain control circuit 304, and an analog to digital converter 302, operably connected to a processor 303, in this case a programmable DSP core containing program firmware, ROM/RAM, and any other components that may be required by one skilled in the art.

The processor 303 is operably connected with a memory 205 for storage of voice reference patterns and persistent system configuration information. The memory 205 may be any form of memory device(s) known in the art. Since the structure and function of the memory 205 is well known in the art, it is not discussed in greater detail herein. The function of the memory 205 is discussed in greater detail below.

The processor is also operably connected to a digital to analog converter 306 (DAC) for converting digitally stored audible prompts to analog signals. The signals are sent through an audio normalization circuit 307 to an external speaker 400. The external speaker 400 may be used for generating audible prompts and providing status messages.

Figure 4:
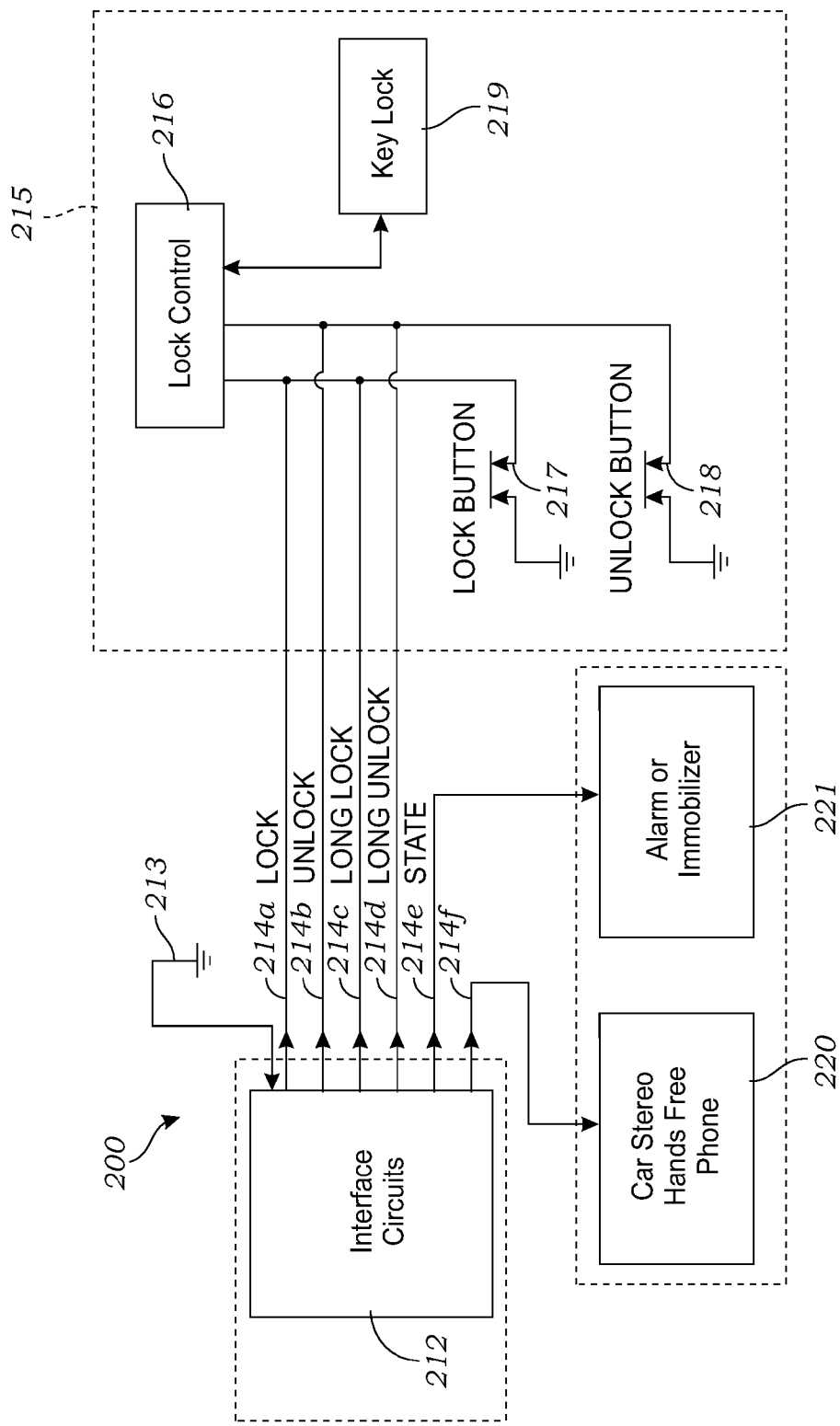
FIG. 4 is a block diagram of an interface circuit operably connected with a first embodiment of an interface module.
Figure 5:
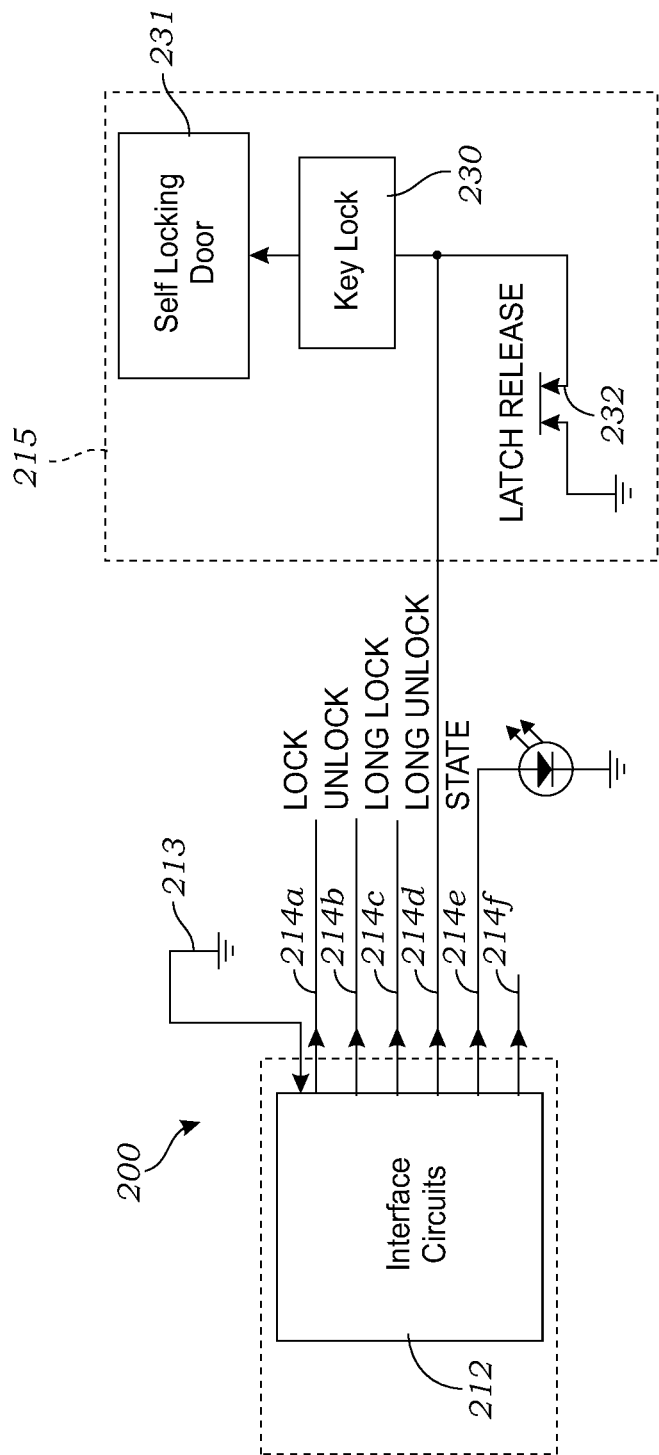
FIG. 5 is a block diagram of the interface circuit operably connected with a second embodiment of the interface module.
Figure 6:
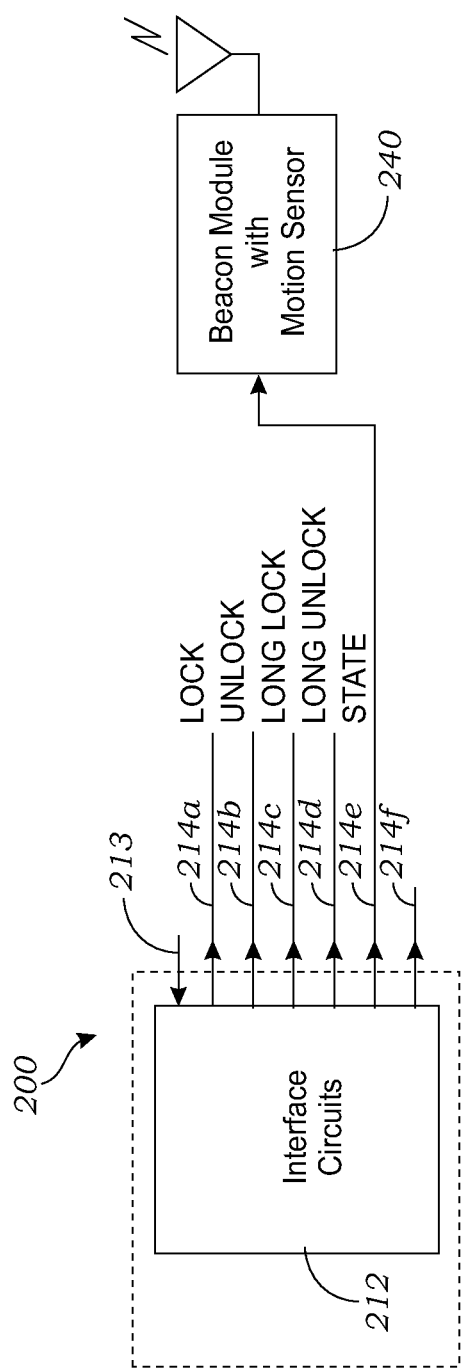
FIG. 6 is a block diagram of the interface circuit operably connected with a third embodiment of the interface module.

A configurable serial communications port 308 is used for data communications between the device and external controllable devices. The interface circuit 212 is capable of re-routing a selectable switched input line 213 from the controlled device 12 to various switched output return lines 214, for operatively controlling the controlled device 12. Various embodiments of this construction are illustrated in FIGS. 4-6, and discussed in greater detail below.

FIG. 2 is a block diagram of a second embodiment of the biometric voice command and control switching device 10, wherein the microphone assembly 100 includes two microphones 101A and 101B, and a noise cancellation circuit 108. In the embodiment of FIG. 2, the first microphone 101A is operably connected to the processing device 200 through the noise cancellation circuit 108. The second microphone 101B is operably connected to the audio selective detection circuit 105, and also to the noise cancellation circuit 108. The first microphone 101A and the noise cancellation circuit 108 are both operably controlled by the microphone enable signal 107 from the processor 303.

In this configuration, the processor 303 may turn off the first microphone 101A and the noise cancellation circuit 108, to save power until the device 10 is activated. The second microphone 101B is left ready to receive the audio trigger and transmit it to the audio selective detection circuit 105, for switching on the device 10.

Once the device 10 has been triggered by the audio selective detection circuit 105, the first microphone 101A is turned on, and the first and second microphones 101A and 101B are then able to transmit audio to the processing device 200 with background noise having been removed or diminished by the noise cancellation circuit 108.

Figure 3:
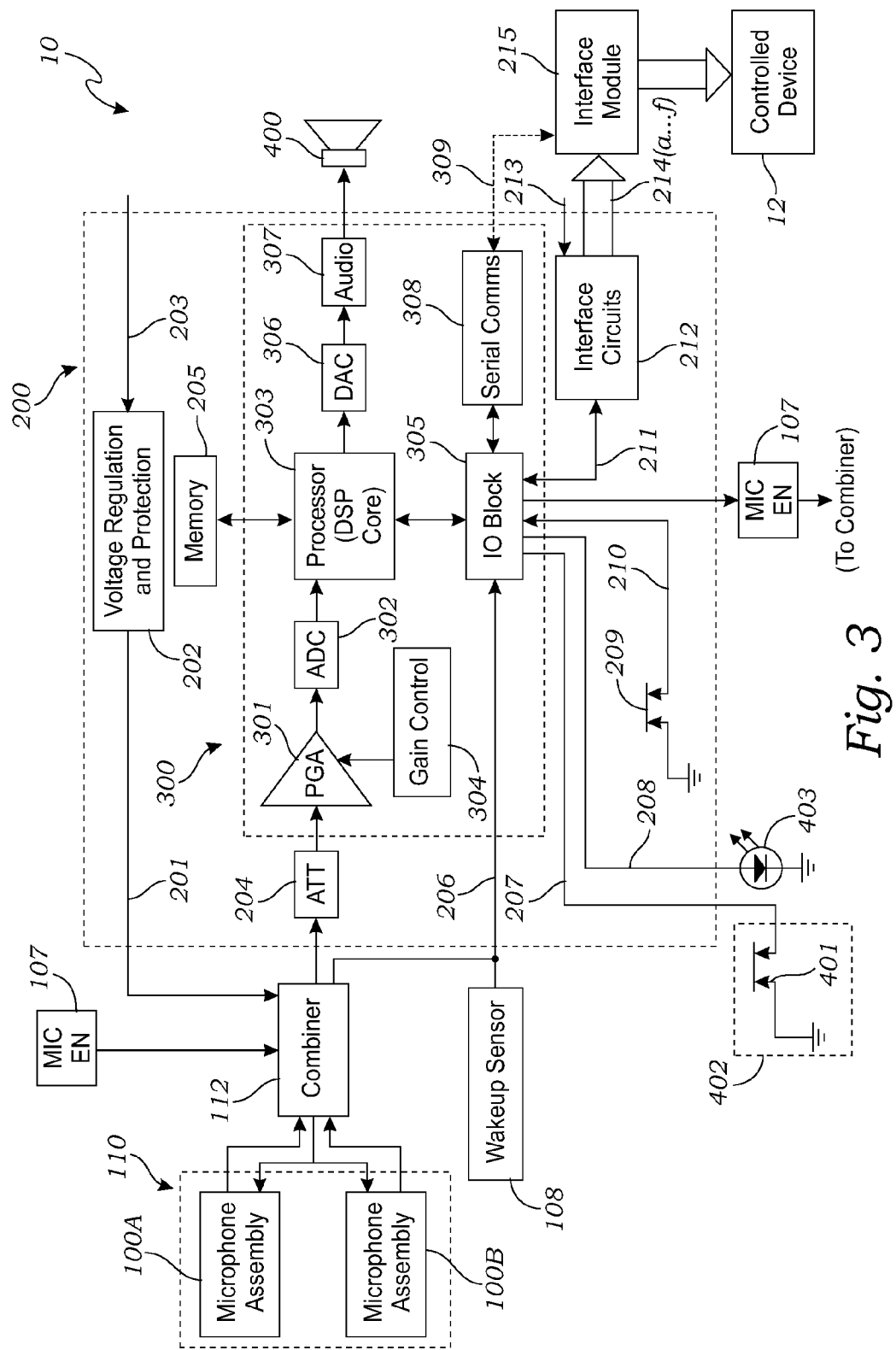
FIG. 3 is a block diagram of a third embodiment of the biometric voice command and control switching device that includes two microphone assemblies connected with a signal combiner.

FIG. 3 is a block diagram of a third embodiment of the biometric voice command and control switching device 10 that includes a microphone system 110 that includes multiple microphone assemblies 100 (in this case, two, 100A and 100B, although other numbers of microphone assemblies may be used. Each assembly may or may not include noise cancelling technology. The two microphone assemblies 100A and 100B are combined with a combiner 112. The term "combiner" is hereby defined to include any form of combining device that functions as described herein. The combiner 112 combines the output signals from the microphones, and routes power and control signals to all devices.

As illustrated in FIG. 3, the combiner 112 is operably attached to the voice processing unit 300, and enables the receipt of utterances as discussed above. The combiner 112 may also be operatively connected with the processor 303 to receive a microphone enable signal 107 for operatively initiating the combiner 112 (and/or noise cancelling circuit) for operating in noisy environments.

Figure 7:
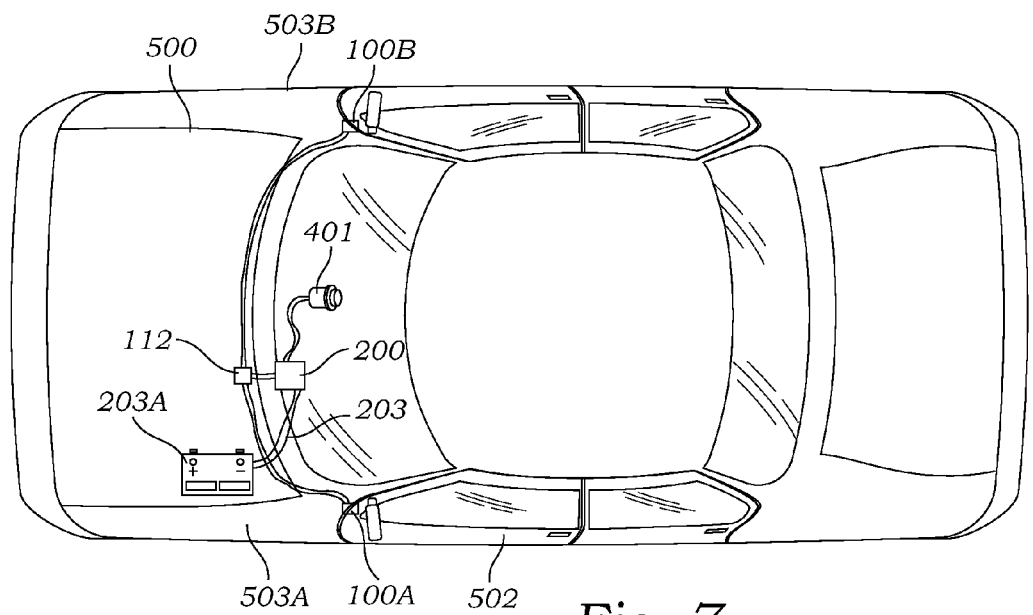
FIG. 7 is a top plan view of a vehicle having the biometric voice command and control switching device of FIG. 3 installed therein.
Figure 8:
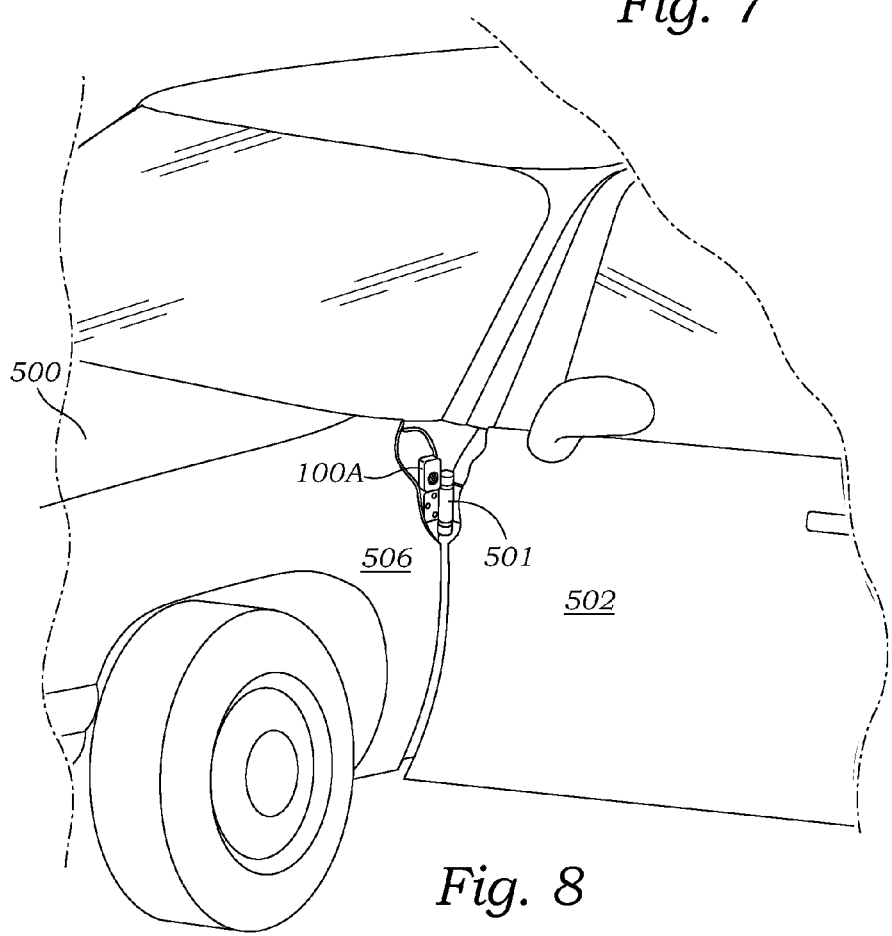
FIG. 8 is a close up perspective view of a hinge of a front door of the vehicle of FIG. 7, illustrating the installation of a microphone assembly on the hinge in one embodiment of the installation of the device.

This embodiment may be used in many applications that are suited for this construction. One particular application of this embodiment is for use with a vehicle, such as a car. This embodiment is illustrated in FIGS. 7-8, discussed in greater detail below. Alternative applications of this embodiment may also be devised by those skilled in the art, and should be considered within the scope of the present invention. For purposes of this application, the term "vehicle" is hereby defined to include any form of vehicle, automobile, cart, boat, vessel, ship, truck, portable container, trailer, mobile home, airplanes, trains, tractors, and/or any other mobile structure that may utilize the device 10 in the manner described herein.

FIG. 4 is a block diagram of a first embodiment of the interface circuit 212 interconnected with a first embodiment of the interface module 215. As illustrated in FIG. 4, the interface circuit 212 of this embodiment is connected to generate state signals for operatively controlling the controlled device 12. In this embodiment, the device 10 is suitable for use in locking and unlocking any locked vehicle, structure, and/or other object that may include locks. A lock control 216 that controls the locks of the vehicle (or structure, etc.) may be operatively controlled by a lock button 217 and an unlock button 218, as well as a mechanical key lock 219. These features are already present in the controlled device 12 (of FIG. 1), and are not part of the current invention.

While several examples of controlled devices 12 are discussed in greater detail, the invention is not limited to these particular embodiments, but should include any form of device that may be actuated by a user. Some examples include locks for doors for various structures, as discussed herein. Other examples include locks or other features of vehicles, as discussed herein. Yet other examples include integrations to control thermostats, appliances, safety shop cutoff switches, parking gates, garage doors, kitchen cupboards, safes, cash registers, freezers, drug storage cabinets, forklifts, and any form of similar or equivalent devices.

The switched output return lines 214, also illustrated in FIGS. 1 and 2, may include in the embodiment of FIG. 4 a first switched signal output 214*a* for assertion of a first short momentary switched signal when transitioning from NORMAL to ACTIVE mode (unlocked to locked) to lock the lock control 216 (e.g., of a vehicle, vessel, home, or any other form of the secured space), as an alternative to the lock button 217 that may otherwise be used. A key lock 219 might also be available for this unlocking procedure.

In the embodiment of FIG. 4, a second switched signal output 214*b* for assertion of a second, long momentary switched signal when transitioning from NORMAL to ACTIVE mode (locked to unlocked), as an alternative to the unlock lock button 218. A third switched signal output 214*c* asserts a first short momentary switched signal when transitioning from ACTIVE to NORMAL mode. A fourth switched signal output 214*d* asserts a second, long momentary switched signal when transitioning from NORMAL to ACTIVE mode. A latched dual state digital signal output 214*e* indicates the current mode of the present device (NORMAL or ACTIVE) in order to communicate with an external controllable device such as an alarm or immobilizer 221 (e.g., alarm, cut-off switch or armed security/monitoring device). An audio mute signal output 214*f* may be operably connected to a car stereo hand free phone 220 for assertion of a mute signal to external audio systems to automatically turn off external audio sources while playback of audible prompts or speech capture is occurring.

In operation, the mute signal output 214*f* is not asserted if the external wake digital signal input 206 is used to bring the device out of a low power sleep state unless the device is awaiting wakeup for the purposes of creating a new voice reference pattern training This is a non-obvious behavior for devices of this type and is done to improve efficiency and usability more suitable for a consumer market.

FIG. 5 is a block diagram of the interface circuit 212 interconnected with a second embodiment of the interface module 215, in which the interface circuit 212 is interconnected with a self locking door 231. The interface circuit 212 may be connected with a key lock 230 to control the self locking door 231 as an alternative to a latch release 232.

FIG. 6 is a block diagram of a third embodiment of the interface circuit 212 interconnected with a beacon module with motion sensor 241, for activation of a tracking beacon or similar device. Obviously the specific embodiments may vary, and similar or equivalent embodiments should be considered within the scope of the present invention. All of the embodiments connect to existing systems in a variety of ways, utilizing common core elements to limit control of these systems to authorized individuals using voice without requiring a physical key or token to be carried by said individuals. The external access control systems that will integrate to create new embodiments that may be realized by those skilled in the art, will utilize a physical electrical switch or reception of data packets to perform a desired action that releases or enforces secure access of some type. All embodiments presented are capable of supporting and managing multiple biometric voice patterns internally, independent of the external systems to which they connect, comprising a plurality of commands and individuals. The utterances used to generate the voice patterns are language independent allowing an individual to select an utterance that works best for them and change it if so desired. The embodiments provide audible feedback and prompted configuration menus to provide selection between several levels of command and control. These embodiments show some of the ways the discreet multi-user biometric voice command and control switch can be used to control a wide variety of existing electronic systems utilizing buttons, switches or electronic sensors to facilitate state changes or commands primarily in, but not limited to, access control systems.

As illustrated in FIGS. 1-6, in use, once the interface circuit 212 has been operably connected with the controlled device 12 via the interface module 215 of the controlled device 12, the device 10 is ready to be "trained" for use. A reference utterance (or several) may be received via the microphone assembly 100 (or other suitable microphone). An electronic signal indicative of the reference utterance is created, and the electronic signal of the reference utterance is stored in the memory 205. This process is discussed in greater detail below.

Once the device 10 has been trained, it may be used to operate the controlled device 12. A currently spoken challenge utterance is received via the microphone assembly 100 (or other suitable microphone), and an electronic signal indicative of the currently spoken challenge utterance is created and stored in the memory 205. The device 10 is then used to compare the electronic signals of the reference utterance and the currently spoken challenge utterance, utilizing the processor 303, to determine if there is a match. If there is a match, the interface circuit 212 and the interface module 215 may be used to operably control the controlled device 12 to perform a function, such as to unlock the door.

The device 10 may include a means for adding, erasing and managing the reference utterances into groups of administrative and non-administrative utterances. The means may include a computer program operatively installed in the memory 205 and performed by the processor 303 (or other processing device) to perform these functions.

The device 10 may include a means for providing an audible administrative configuration menu for the purposes of changing user selectable options. The means may include a computer program operatively installed in the memory 205 and performed by the processor 303 (or other processing device) to perform these functions.

The device 10 may include a means for saving previously accepted captured utterances for the purpose of combining them with a future accepted stored captured utterance for the purpose of updating the plurality of previously stored spoken utterances whereby small changes in the spoken utterances are adjusted over time. The means may include a computer program operatively installed in the memory 205 and performed by the processor 303 (or other processing device) to perform these functions.

The device 10 may include an electronic switch, in this case internal mounted momentary switch 209 in the embodiment of FIG. 1, for providing an audible installer configuration menu for the purposes of changing installer selectable options, accessible only if there are no previously captured utterances stored. The means may include a computer program operatively installed in the memory 205 and performed by the processor 303 (or other processing device) to perform these functions.

FIGS. 7 and 8 illustrate a particular embodiment of the biometric voice command and control switching device 10 installed in a vehicle 500. FIG. 7 is a top plan view of the vehicle 500 having the device 10 of FIG. 3 installed therein. As illustrated in FIG. 7, the processing device 200 may be installed within the secured space 402, in this case the passenger compartment of the vehicle 500. In an alternative embodiment, the processing device 200 may be installed in alternative locations, such as in the door of the vehicle, or in other locations deemed suitable by one skilled in the art. The concealed momentary switch 401 may be installed within the passenger compartment 402, in a convenient location (i.e., the dashboard) for use, or in alternative suitable locations. The processing device 200 may be operatively connected to a battery 203A of the vehicle 500, which provides a convenient power source, although alternative power sources may also be used.

FIG. 8 is a close up perspective view of a hinge 501 of a front door 502 of the vehicle 500 of FIG. 7, illustrating the installation of the microphone assembly 100 on or adjacent the hinge 501 in one embodiment. As illustrated in FIG. 8, each of the first and second microphone assemblies 100A and 100B are operably mounted on or adjacent the hinge 501 of the doors 502, one on each side of the vehicle, adjacent a gap 505 between the door 502 and a front 506 of the vehicle 500. The gap 505 permits the microphone assemblies 100A and 100B to easily receive sound when the user is standing adjacent the door 502, while still offering significant protection for the microphone assemblies 100A and 100B from damage and debris. Alternative locations of the microphone assemblies 100A and 100B (and/or additional microphone assemblies) may also be used, according to the designs of one skilled in the art. For example, the microphone assemblies 100A and 100B may be located in side mirrors, or other suitable locations. Such alternative locations should be considered within the scope of the claimed invention.

One benefit of providing microphone assemblies 100A and 100B on both sides 503A and 503B of the vehicle 500 is that the microphone assemblies 100A and 100B are able to reduce background noise independently, which is heard on either side of the vehicle 500, while retaining the utterances, which are only heard on one of the microphone assemblies 100A and 100B. A further benefit of providing microphone assemblies 100A and 100B on both sides 503A and 503B of the vehicle 500 is that the user is able to unlock the vehicle 500 from either side.

In operation, once the interface circuit 212 has been connected with the locks of the vehicle 500 (such as is illustrated in FIG. 4), the device 10 may be trained. While FIGS. 7-8 illustrate one embodiment of how the device may be installed, alternative installations are also considered within the scope of the present invention. For example, the device 10 may be installed within the door, or in any other suitable location.

Figure 9A:
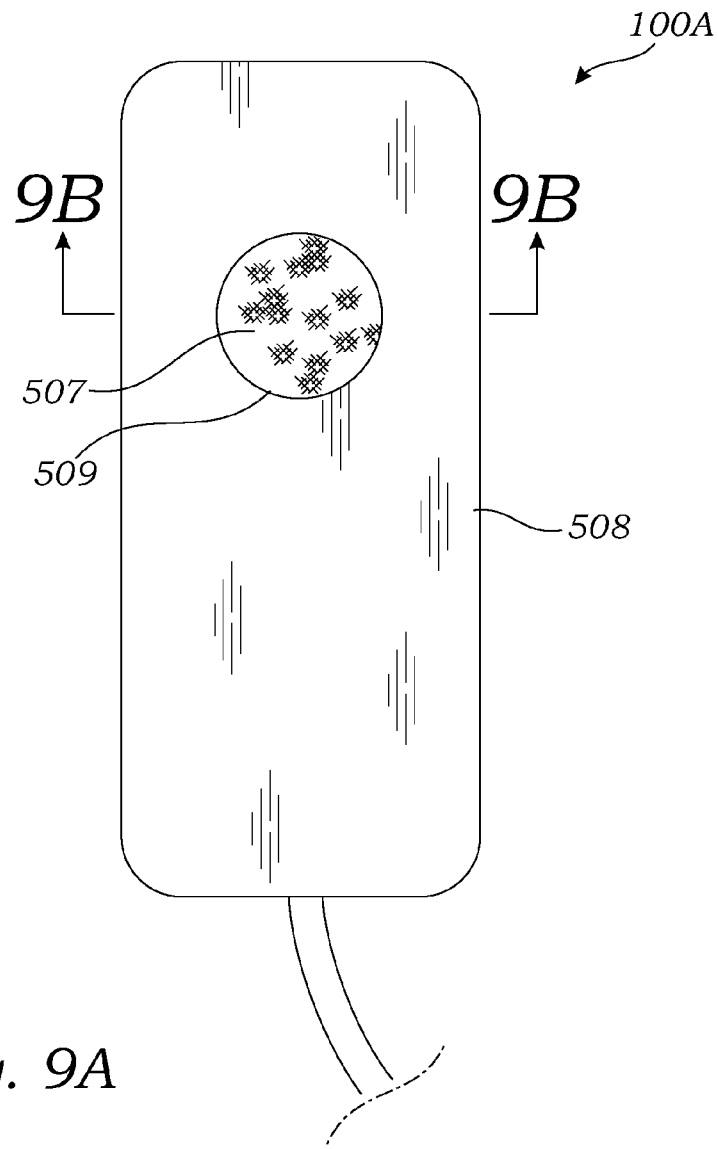
FIG. 9A is a top plan view of a housing of one embodiment of the microphone assembly of FIG. 8, illustrating a protective fabric cover for protecting the microphone assembly from water and debris.

FIG. 9A is a top plan view of a housing 508 containing one embodiment of the microphone assembly 100A (or 100B) of FIG. 8. As illustrated in FIG. 9A, the housing 508 includes a protective fabric cover 507 for protecting the microphone assembly 100A from water and debris.

Figure 9B:
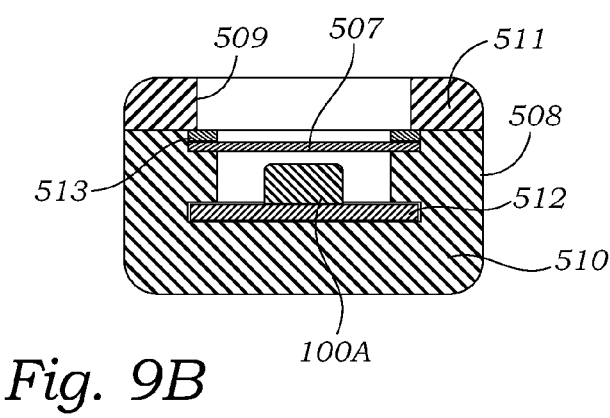
FIG. 9B is a sectional view of thereof taken along lines 9B-9B in FIG. 9A.

FIG. 9B is a sectional view thereof taken along lines 8B-8B in FIG. 9A. As illustrated in FIG. 9B, the housing 508 contains and protects the microphone assembly 100A. The housing 508 has an acoustic aperture 509 (e.g., aperture, vent, bore, or other form of opening) that enables the microphone assembly 100A to receive sound. A weatherproof fabric cover 507 covers the acoustic aperture 509 to prevent water, dust, debris, etc., from reaching the microphone assembly 100A.

In one embodiment, the housing 508 is constructed of a bottom portion 510 and a top portion 511 that attach together in assembly to surround the microphone assembly 100A (and a printed circuit board 512 of the microphone assembly 100A). In the embodiment of FIG. 9B, the weatherproof fabric cover 507 comprises a non-woven material and an expanded polytetrafluoroethylene membrane, although other suitable materials may also be used in alternative embodiments. The weatherproof fabric cover 507 may be mounted on a frame 513 such as an annular support structure that abuts the housing 508, in this case the top portion 511, for supporting the weatherproof fabric cover 507.

The bottom and top portions 510 and 511 may be formed in a two-stage molded process wherein the bottom portion 510 is formed, the microphone 100A and the weatherproof fabric cover 507 are operably positioned on the bottom portion 510, and then the top portion 511 is formed in the second stage of the molding process. While this represents one embodiment of how the housing 508 may be manufactured, alternative production methods may also be used, and such alternatives should be considered within the scope of the present invention.

Figure 10:
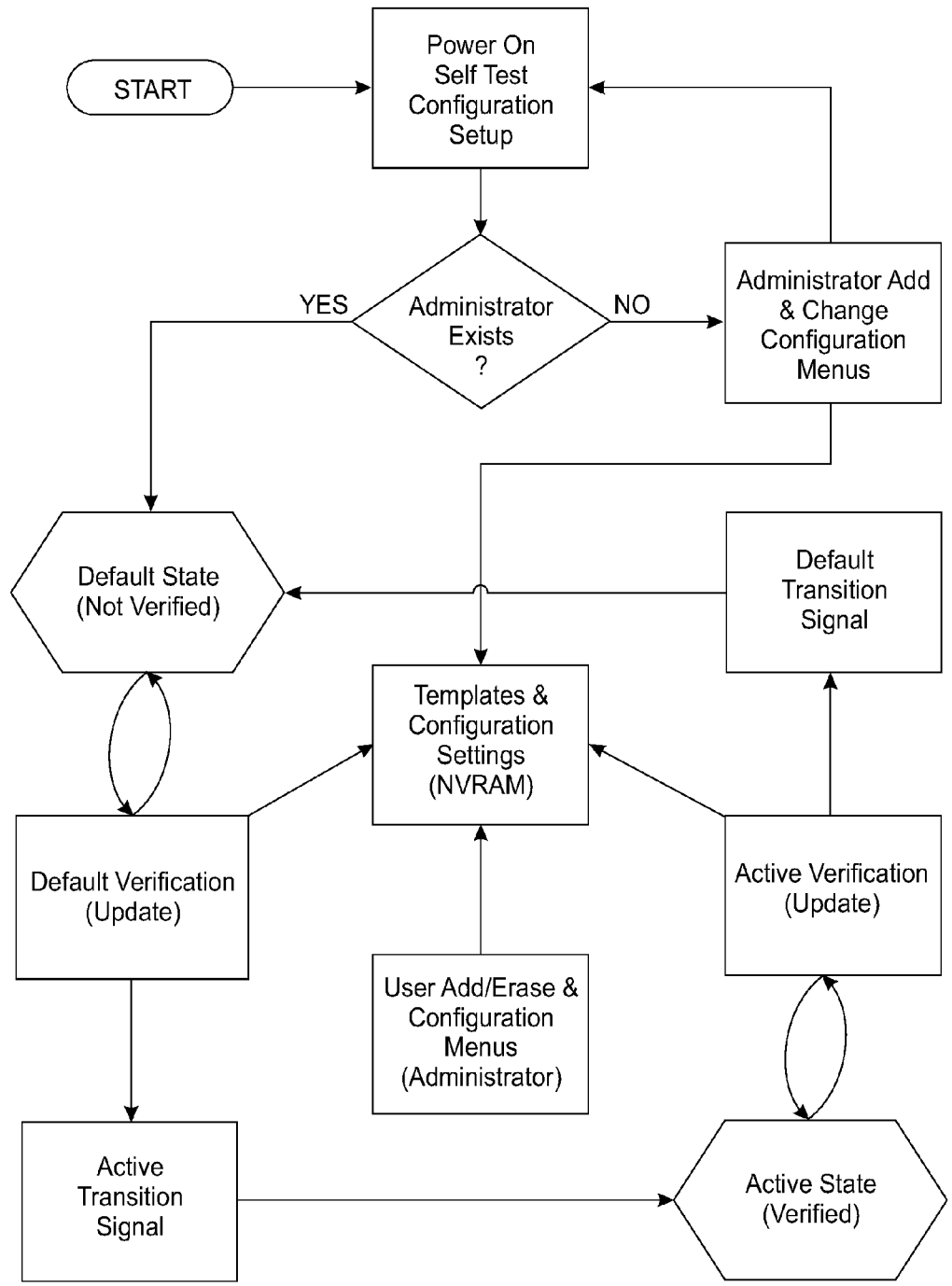
FIG. 10 is a flow diagram illustrating the operation of the biometric voice command and control switching device.

FIG. 10 is a flow diagram illustrating the operation of the biometric voice command and control switching device of FIG. 1. As illustrated in FIG. 10, the operation may start with a power on self test configuration setup. If an administrator already exists, the device may start in a default state (not verified). If an administrator does not exist, the system may first start with administrator add and change configuration menus for performing the steps necessary to set up the administrator. Templates and configuration settings (NVRAM) are set up, and users may be added or erased and menus may be configured. Once the administrator is set up, the default state is verified until the device receives an active transition signal, in which case it moves to an active state, and continues active verification until there is a default transition signal, in which case the device moves back to the default state.

Figure 11:
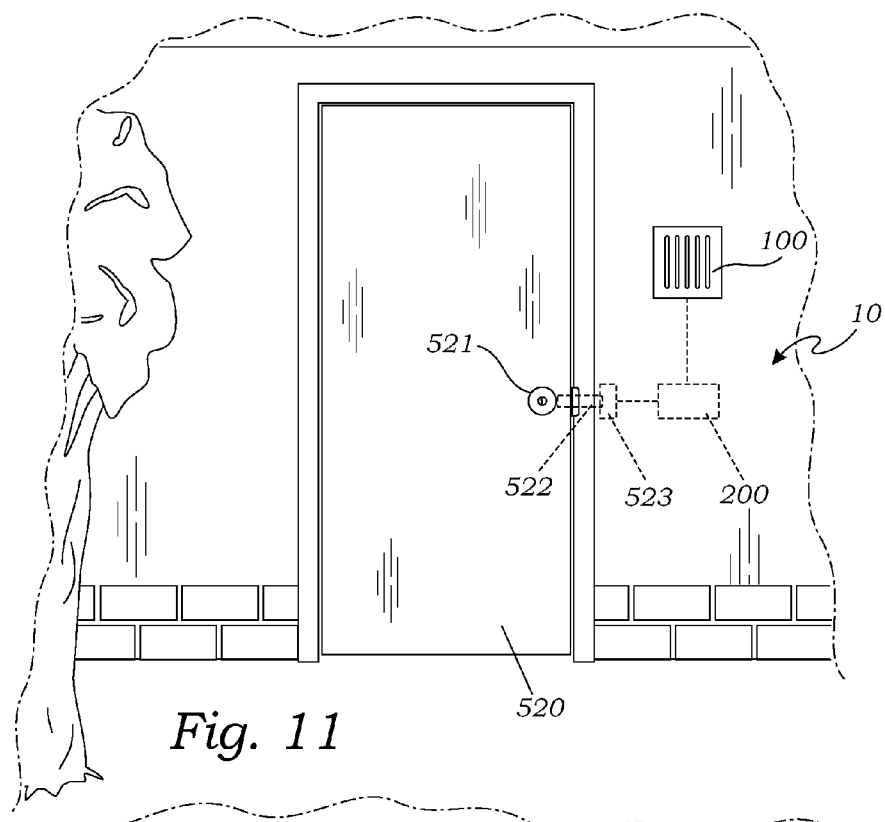
FIG. 11 is an elevational view of a door having the biometric voice command and control switching device of FIG. 1 installed therein.

FIG. 11 is an elevational view of a door 520 having the biometric voice command and control switching device 10 of FIG. 3 installed therein. As illustrated in FIG. 11, the door 520 includes a knob/latch 521 that is operably connected to a door lock 522 used to lock/unlock the door 520. The processing device 200 is installed in the wall or inside of the structure, and includes the microphone assembly 100 operably positioned adjacent the door 520. The processing device 200 is operably connected with an unlocking mechanism 523 for unlocking the door lock 522 of the door 520. The processing device 200 may alternatively be installed within the door 520, or in any other suitable location, in alternative embodiments of the invention.

Figure 12:
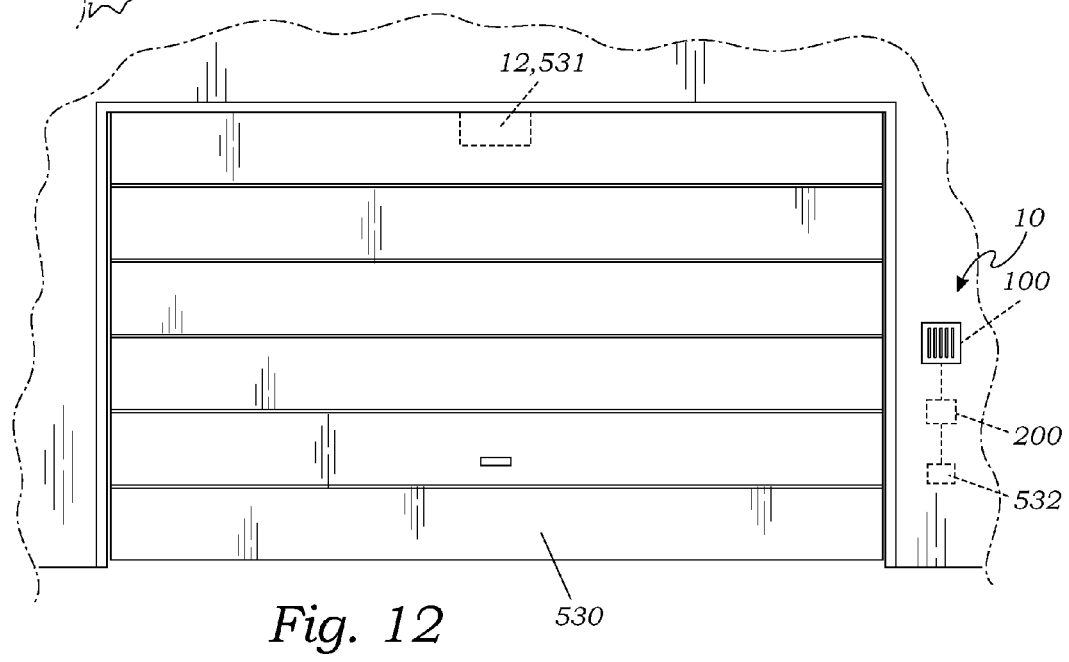
FIG. 12 is an elevational view of a garage door having the biometric voice command and control switching device of FIG. 1 installed therein.

FIG. 12 is an elevational view of a garage door 530 having the biometric voice command and control switching device 10 of FIG. 3 installed therein. In this embodiment, the processing device 200 is operably connected to a transmitter 532 to operably control a garage door opener 531 of the garage door 530.

While this application discusses several particular embodiments, those skilled in the art may devise many alternative embodiments of this invention, and such alternatives should be considered within the scope of the present invention. Some examples of alternative installations of the present invention include commercial property, gated entrances to private areas, parking structures and the like, and also dual-microphone installations in any form of structures (e.g., front and back doors or a commercial or residential structure, garage and side doors of a garage, etc.). These alternative installations are only meant to be illustrative of potential options, and the invention is meant to encompass alternative installations such as may be devised by one skilled in the art.

Figure 13:
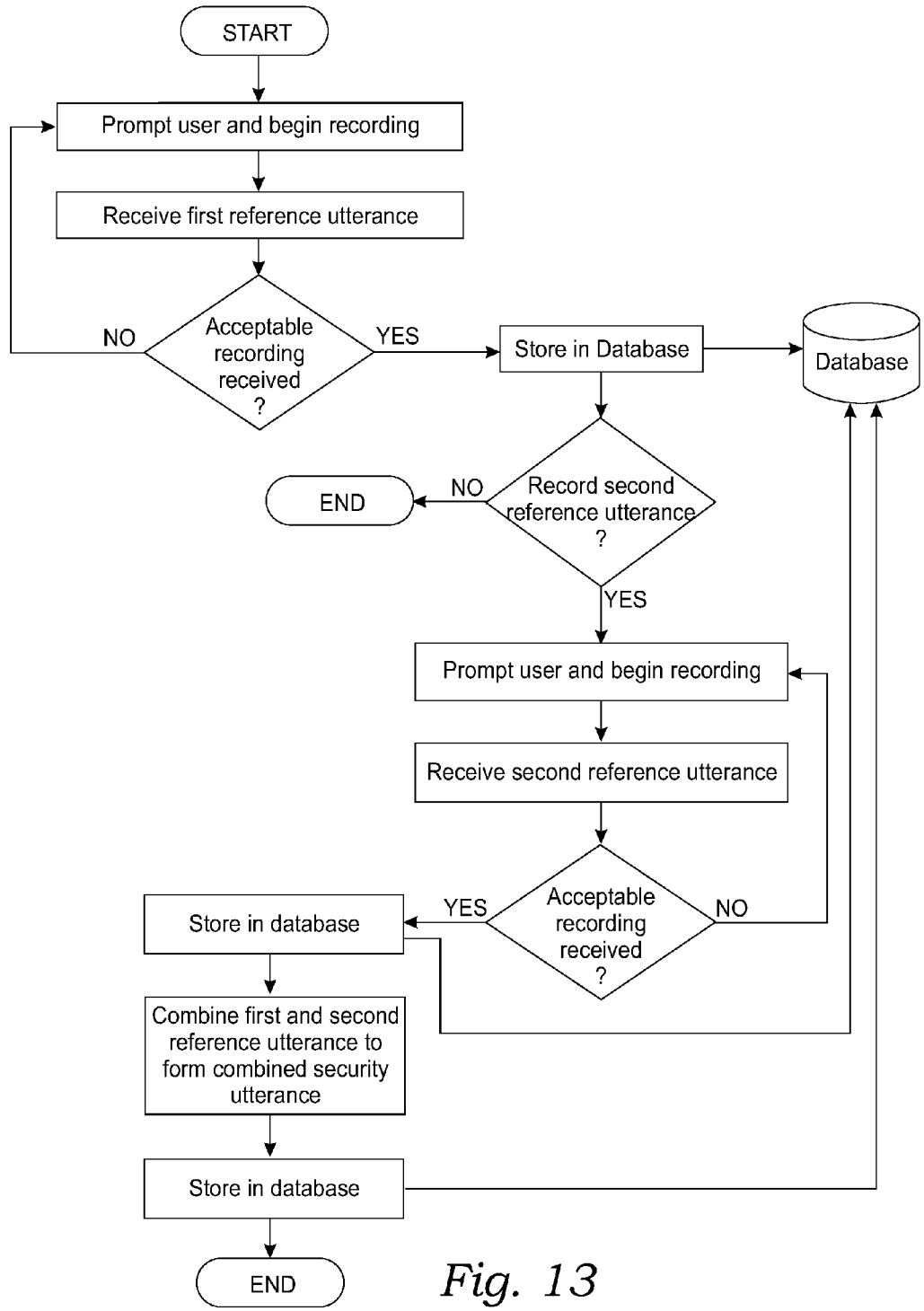
FIG. 13 is a flow diagram illustrating a method of receiving and recording reference utterances.

FIG. 13 is a flow diagram illustrating a method of receiving and recording reference utterances. In this embodiment, multiple reference utterances are received and stored in a database within the memory of the device. In this embodiment, multiple reference utterances are received, each being used to create an electronic signal indicative of the reference utterance, and further comprising the steps of combining the electronic signals of the multiple reference utterances to form a combined electronic signal, and storing the combined electronic signal in the memory, and then comparing the currently spoken challenge utterance with the combined electronic signal to determine a match. The first, second, and/or combined reference utterances, and/or others, may all be used in determining if the challenge utterance is a match.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A biometric voice command and control switching device for operably controlling a controlled device in response to a currently spoken challenge utterance by correlating and comparing the currently spoken challenge utterance to at least one previously stored reference utterance, the biometric voice command and control switching device comprising:
    a microphone assembly for receiving the currently spoken challenge utterance and the at least one previously stored reference utterance;
    a voice processing circuit for creating an electronic signal indicative of the currently spoken challenge utterance and the at least one previously stored reference utterance;
    a memory for storing the electronic signals of the currently spoken challenge utterance and the at least one previously stored reference utterance;
    a processor for comparing the electronic signals of the currently spoken challenge utterance and the at least one previously stored reference utterance and determining if there is a match;
    an interface circuit for operably controlling the controlled device in response to the currently spoken challenge utterance when a match is determined by the processor; and
    a housing containing the microphone assembly, the housing having an acoustic vent that enables the microphone assembly to receive sound, the acoustic vent having a weatherproof fabric cover covering the acoustic vent.

2. The biometric voice command and control switching device of claim 1, further comprising a means for adding, erasing and managing the reference utterances into groups of administrative and non-administrative utterances.

3. The biometric voice command and control switching device of claim 1, further comprising a means for providing an audible administrative configuration menu for the purposes of changing user selectable options.

4. The biometric voice command and control switching device of claim 1, further comprising a means for saving previously accepted captured utterances for the purpose of combining them with a future accepted stored captured utterance for the purpose of updating the plurality of previously stored spoken utterances whereby small changes in the spoken utterances are adjusted over time.

5. The biometric voice command and control switching device of claim 1, further comprising an electronic switch for providing an audible installer configuration menu for the purposes of changing installer selectable options.

6. The biometric voice command and control switching device of claim 1, wherein the microphone assembly includes first and second microphone assemblies connected by a combiner.

7. The biometric voice command and control switching device of claim 1, wherein the interface circuit generates state signals for operatively controlling the controlled device.

8. The biometric voice command and control switching device of claim 1, further comprising a weatherproof fabric cover for covering the microphone assembly.

9. The biometric voice command and control switching device of claim 1, wherein the weatherproof fabric cover comprises a non-woven material and an expanded polytetrafluoroethylene membrane.

10. The biometric voice command and control switching device of claim 9, wherein the weatherproof fabric cover is mounted on an annular support structure that abuts the housing.

11. The biometric voice command and control switching device of claim 1, further comprising a wakeup sensor for initiating operation of the device.

12. A method for controlling locks on a vehicle, the method comprising the steps of:
    providing a biometric voice command and control switching device comprising:
        first and second microphone assemblies operably connected to a combiner;
        a housing containing the first microphone assembly, the housing having an acoustic vent that enables the first microphone assembly to receive sound, the acoustic vent having a weatherproof fabric cover covering the acoustic vent;
        a voice processing circuit operably connected with a memory and a processor; and
        an interface circuit operably connected with the processor;
    installing the first and second microphone assemblies on opposite sides of the vehicle, the first microphone assembly being positioned in a secured space of a door of the vehicle;
    operably connecting the combiner of the first and second microphone assemblies with the voice processing circuit;
    operably connecting the interface circuit with the locks of the vehicle;
    receiving a reference utterance via one of the first or second microphone assemblies;
    creating an electronic signal indicative of the reference utterance;
    storing the electronic signal of the reference utterance in the memory;
    receiving a currently spoken challenge utterance via one of the first or second microphone assemblies;

reducing background noise received along with the currently spoken challenge utterance by reducing far-field sounds that are received;

creating an electronic signal indicative of the currently spoken challenge utterance;

storing the electronic signal of the currently spoken challenge utterance in the memory;

correlating and comparing the electronic signals of the reference utterance and the currently spoken challenge utterance, utilizing the processor, and determining if there is a match; and generating a state signal to the locks of the vehicle to either lock or unlock the vehicle in response to the currently spoken challenge utterance, if there is a match.

13. The method of claim 12, wherein the step of installing the first and second microphone assemblies comprises operably mounting each of the first and second microphone assemblies on or adjacent a hinge of a door, one on each side of the vehicle, adjacent a gap between the door and a front of the vehicle.

* * * * *